United States Patent [19]

Michelotti et al.

[11] Patent Number: 5,902,666

[45] Date of Patent: May 11, 1999

[54] CORRUGATED SHEET HAVING A CRYSTALLINITY GRADIENT

[76] Inventors: Leopoldo Michelotti; Marco Michelotti, both of Viale Brianza, 31-Monza (Milan), Italy, 20052

[21] Appl. No.: 08/831,594

[22] Filed: Apr. 10, 1997

Related U.S. Application Data

[63] Continuation of application No. 08/343,926, Nov. 17, 1994, abandoned.

[30] Foreign Application Priority Data

Nov. 17, 1993 [IT] Italy .................................. MI93A2442

[51] Int. Cl.$^6$ .............................. B32B 3/02; B32B 27/16; B32B 27/20; B32B 27/36
[52] U.S. Cl. ........................ 428/182; 428/174; 428/179; 428/181; 428/212; 428/325; 428/327; 428/328; 428/330; 428/331; 428/332; 428/338; 428/339; 428/409; 428/480; 428/903.3; 525/64; 525/92 F; 525/176
[58] Field of Search ................................. 428/212, 217, 428/218, 409, 910, 181, 182, 179, 480, 174, 325, 327, 329, 330, 331, 332, 338, 339, 903.3; 427/314, 316, 322; 264/234, 235, 235.6, 235.8, 286, 287, 345, 346, 519, 521, 522; 525/165, 176, 64, 92 F

[56] References Cited

U.S. PATENT DOCUMENTS

| | | | |
|---|---|---|---|
| 3,960,807 | 6/1976 | McTaggart | 260/40 R |
| 4,022,748 | 5/1977 | Schlichting et al. | 260/40 R |
| 4,499,040 | 2/1985 | Maemoto et al. | 264/167 |
| 4,693,941 | 9/1987 | Ostapchenko | 428/480 |
| 4,713,268 | 12/1987 | Carson | 428/35 |
| 4,983,648 | 1/1991 | Laughner et al. | 523/351 |
| 5,277,864 | 1/1994 | Blatz | 264/328.17 |
| 5,281,387 | 1/1994 | Collette et al. | 264/521 |
| 5,407,999 | 4/1995 | Hert et al. | 525/155 |
| 5,410,000 | 4/1995 | Borman | 525/427 |

FOREIGN PATENT DOCUMENTS

| | | |
|---|---|---|
| A0088625 | 9/1983 | European Pat. Off. . |
| 0139084A2 | 5/1985 | European Pat. Off. . |
| A0185103 | 6/1986 | European Pat. Off. . |
| A0211649 | 2/1987 | European Pat. Off. . |
| A0221338 | 5/1987 | European Pat. Off. . |
| 0287140A1 | 10/1988 | European Pat. Off. . |
| A0438240 | 7/1991 | European Pat. Off. . |
| A0544147 | 6/1993 | European Pat. Off. . |
| A2504055 | 10/1982 | France . |
| A1604740 | 1/1971 | Germany . |
| 912949 | 3/1972 | Italy . |
| A8802113 | 3/1990 | Netherlands . |
| WO92/03505 | 3/1992 | WIPO . |

OTHER PUBLICATIONS

Patent Abstracts of Japan, vol. 7, No. 189 (M–237) Aug. 18, 1983 & JP–A–58 092 536 (Touyou Seikan KK) Jun. 1, 1983.
Patent Abstracts of Japan, vol. 14, No. 314 (C–0737) Jul. 5, 1990 & JP–A–02 107 661 (Mitsubishi Rayon Co Ltd) Apr. 19, 1990.
Patent Abstracts of Japan, vol. 9, No. 142 (M–388) Jun. 18, 1985 & JP–A–60 023 030 (Takiron KK) Feb. 5, 1985.

*Primary Examiner*—Vivian Chen
*Attorney, Agent, or Firm*—Nixon & Vanderhye, P.C.

[57] ABSTRACT

A corrugated sheet comprising:
  50–90% by weight of recycled polyethylene terephthalate;
  5–20% by weight of a rubber;
  10–45% by weight of an inert filler;
and having a crystallinity gradient such that said shaped sheet maintains the shape, under its own weight, up to a temperature of at least 70° C. and has impact strength which is substantially greater compared to that of the fully crystallized shaped sheet.

7 Claims, No Drawings

CORRUGATED SHEET HAVING A CRYSTALLINITY GRADIENT

This is a of application Rule 62 continuation of Ser. No. 08/343,926, filed Nov. 17, 1994, now abandoned.

The present invention relates to an article of manufacture in the form of a polyethylene terephthalate shaped sheer and a method for producing it. More particularly, it relates to a shaped sheet, for use mainly in building, which has different structural and mechanical properties at different depths of its thickness.

BACKGROUND OF THE INVENTION

It is known that polyethylene terephthalate (PET) now constitutes the plastic material of choice for producing containers for drinks due to the fact that it does not release potentially toxic substances into the contents.

It is also known that current regulations do not allow the abovementioned containers to be reused.

Therefore large quantities of disposable PET containers are being accumulated.

In this description and the subsequent claims, the PET of the aforementioned disposable containers is indicated by the terra "recycled PET".

The Italian Patent Application No. M191 A 002949 filed on Nov. 6, 1991 pointed out the uneconomical nature of the methods proposed to date for disposing of the abovementioned containers (incineration or depolymerisation and recovery of the monomers) and proposed recycling polyethylene terephthalate (PET) by extruding it into shaped sheets for building.

In particular, the abovementioned application proposed washing PET containers, crushing them and drying them thoroughly up to a moisture content of from 20 to 50 ppm. The resulting material was then crystallized, mixed with an inert mineral filler and extruded in flat sheets finally, the latter could be shaped in the form of corrugated sheets or other profiles, for example fretted, by conventional machines and techniques, The shaped sheets obtained in this way were however found to be highly crystallized, with poor elasticity and low impact strength, a sheet with thickness of 3 mm breaking on the impact of a cylindrical striking mass, with spherical head and weighing 2 kg, from a height of only 0.2 m.

The Japanese Patent Application Opened No. 92,536/83 describes a biaxially-oriented plastic bottle comprising a bottom portion, a body portion, a shoulder portion and a neck portion formed by biaxially-oriented blow molding a parison of virgin polyethylene terephthalate, wherein said neck portion has a highly crystallized outer surface layer with density of no less than 1.36 g/cc, and a less crystallized inner surface layer with density of no more than 1.35 g/cc.

In order to achieve such crystallization the outer surface of the neck portion is heated at 180° C. for 30 seconds to 1 minute white the inner neck portion is maintained at a lower temperature.

However, when this procedure was utilized to manufacture a shaped sheet made from a blend of recycled PET and an inert mineral filler, unsatisfactory results were obtained (see Comparative Example 1).

SUMMARY OF THE INVENTION

It has now unexpectedly been found that, when producing shaped sheets, differentiated heat treatment provides good results only when an additive, capable of reducing the inclination of PET to crystallize when hot, is added to the blend of recycled PET and inert filler.

These additives are commonly known to the persons skilled in the art as "rubbers". Examples of "rubbers" are PARALOID™ of Rohm & Haas, Philadelphia (USA) (acrylic core-and-shell impact modifier), and the blends of LOTADER™ (etheyle/acrylic ester/maleic anhydride terpolymer) and of LOTRYL™ of Elf Atochem S. A., Paris (France) (ethylene/acrylic ester copolymer).

In the present description and in the claims the term "rubber" is therefore used to denote the abovementioned compounds as well as blends thereof and whatsoever other similar compound which is able to reduce the inclination of PET to crystallize when hot.

Generally the amount of "rubber" added to PET ranges from 3 to 25 parts by weight for 100 parts by weight of PET. It is preferably 5–10 parts by weight for 100 parts by weight of PET.

Another unexpected aspect of the present invention is that the shaped sheets produced with blends of recycled PET/rubber inert filler become malleable and compliant at approximately 50–60° C. if, when they are produced, they are heated evenly (Comparative Example 3). On account of this undesirable characteristic they therefore tend to deform, under their own weight, and to collapse under the rays of the summer sun.

DESCRIPTION OF PREFERRED EMBODIMENTS

Contrarity if, after they are shaped, a certain degree of crystallization is produced in the first layers of their upper surface and the first layers of their lower surface are maintained as amorphous as possible, shaped sheets are obtained which do not deform, under their own weight, at temperatures of 70–75° C. and which have both good tensile strength and good elasticity at the flexure impact test.

It is therefore a first object of the present invention to provide an article of manufacture in the form of a shaped sheet comprising:

50–90% by weight of recycled PET and,

10–45% by weight of an inert filler, characterized in that said shaped sheet contains 5–20% by weight of a rubber, has a crystallinity gradient such as to maintain its shape, under its own weight, up to a temperature of at least 70° C. and has an impact strength which is substantially greater compared to that of the fully crystallized shaped sheet.

In a preferred embodiment, a corrugated sheet 3 mm thick resists the impact of a 2 kg weight, having the striking portion in the shape of a ball with a diameter of 38 mm, when said corrugated sheet is placed an two supports 125 mm apart and is struck with an energy of approximately 15 joules on the lower portion of a corrugation of its side having higher crystallinity (ISO 6603/2).

The required crystallinity gradient of the shaped sheet according to the present invention is achieved by suitably heating the side wherein the highest crystallinity degree is to be promoted.

In an embodiment of the invention, the molten blend (about 250–280° C.) of recycled PET/rubber/inert filler which comes out of the extrusion die is transferred on a calender equipped with chill rolls, cooled by inner circulation of water having a low temperature (4–8° C. approximately), which shapes it to the required thickness and width.

Preferably the width of the calendered tape is of from 50 to 200 cm. In turn the thickness is preferably of at least 2 mm. Typical examples of preferred thicknesses range from 2 to 7 mm and, even more preferably, from 2 to 4 mm.

After calendering and cooling, the tape is cut into shaped sheets having the required length. Preferably said length is of from 100 to 1200 cm, even more preferably from 200 to 800 cm.

The thus obtained sheet is brought to a temperature (about 80–90° C.) suitable to shape it. Shaping, for example with a corrugated or fretted profile, is performed with conventional machines and techniques well known to those skilled in the art.

After having been shaped and, if necessary, cooled, the shaped sheet is heated substantially more on one side than on the other.

This treatment is one of the most important phases of the present invention.

The more marked heating of one side, preferably the upper one, can be performed in various ways, for example by IR lamps or with a hot air stream. The upper side of the shaped sheer must preferably be heated to a temperature of over 120–140° C. The time of heating will range depending on parameters which are well-known to the persons skilled in the art, such as temperature, the thickness of the shaped sheet, the heating means used and the like.

For example, when the heat treatment is performed with hot air, the upper side of the shaped sheet may be exposed, for 1–5 minutes, to an air stream having a temperature of between 250–350° C. which laps it at a speed of a few metres per second, preferably at least 4 metres per second.

In this way, after the shaping phase, the configuration of the sheet is stabilised without jeopardising its impact strength. In fact, a corrugated sheet 3 mm thick treated in this way has impact strength of at least 15, preferably 20, joules and maintains its shape, under its own weight, up to temperatures of at least 70° C., preferably 80–85° C.

More particularly, in an embodiment of the present invention, the method comprises the following steps;

washing and crushing of used PET containers, drying of said PET flakes up to a moisture degree of 50–20 ppm, preparation of a composition comprising 50–90% by weight of PET flakes, 5–20% by weight of a "rubber", 10–45% by weight of an inert filler, melting and extruding said composition into the form of a flat tape, cooling of said flat tape, cutting of the tape into flat sheets having the required length, shaping of said flat sheets at 80–90° C. according to a predetermined profile, and heating of the upper surface of said shaped sheets to promote a crystallinity gradient such that said shaped sheet maintains the shape, under its own weight, up to a temperature of at least 70° C. and that it has an impact strength substantially greater compared to that of the fully crystallized shaped sheet.

Alternatively, the composition of the present invention may be extruded by means of a die suitably shaped so that it produces a flat tape having the required shape, thickness and width. Cooling, to at least 90° C., must be as rapid and as efficient as possible, so that the tape maintains its shape until the subsequent differentiated heat treatment. The other steps of processing are wholly equivalent to those already described above.

Therefore it is a further object of the present invention to provide a method for preparing a shaped sheet for building, said method comprising (a) washing and crushing of used PET containers, (b) drying of said flakes of PET up to a moisture degree of 50–20 ppm, (c) the preparation of a composition comprising 50–90% by weight of said recycled PET flakes, 10–45% by weight of an inert filler, (d) the production of shaped sheets according to conventional techniques, and (e) the differentiated heat treatment of said shaped sheets, characterized in that (f) said composition also comprises from 5 to 20% by weight or a rubber, (g) the abovementioned differentiated heat treatment consists of heating the upper surface of said shaped sheets to promote a crystallinity gradient such that said shaped sheet maintains the shape, under its own weight, up to a temperature of at least 70° C. and has substantially greater impact strength compared to that of the fully crystallized shaped sheet.

In the compositions of the shaped sheets according to the present invention, the inert filler is preferably a mineral filler.

Typical examples of inert mineral fitters well-known to the persons skilled in the art are calcium carbonate, talc, titanium dioxide, glass fibres and blends thereof.

Moreover, the compositions according to the present invention may also contain additives of a known type such as, for example, coloured pigments, flame retardants, UV ray absorbing agents and the like.

EXAMPLES

The following examples are intended to illustrate the present invention without, however, limiting it.

Example 1

Blend composition:

70% by weight of recycled PET in the form of flakes obtained by cutting up bottles for mineral water, 8% by weight of PARALOID EXL 3300, and 22% by weight of calcium carbonate.

The abovementioned blend was dried up to a moisture degree lower than 50 ppm and then extruded in ICMA 170 double screw equipment of the firm ICMA, S. Giorgic su Lognano, Varese, Italy. The extrusion temperature was 250° C.

From the cutlet of the extrusion die, the molten mass was transferred to a calender having three chill rolls cooled with water at approximately 4° C.

Thus flat sheets were obtained of the following dimensions; 720×1000×2.5 mm.

The abovementioned sheets were inserted in a continuous pilot tunnel system comprising four sections, each of which 1.4 m in length.

In the first section the sheets were heated with hot air to approximately 85–90° C. to make them deformable: the temperature of the heating air was approximately 125° C.

In the second section the sheets were corrugated to dimensions of 177×51 mm white their temperature was maintained at approximately 85–90° C. with hot air.

In the third section the surface of the upper side of the corrugated sheets was lapped, for about 4 minutes, by an air stream heated to approximately 250° C. while the surface of its lower side was lapped by an air stream at room temperature (15–25° C. approximately).

In the fourth section the sheet was cooled with air at room temperature (15–25° C. approximately).

Chips approximately 0.1 mm thick were taken from a thus obtained shaped sheet at depths of 0, 1, 2 and 2.5 mm by milling slowly so as to avoid even a small rise in temperature.

The specimens were tested by differential calorimetric analysis with Mettter TA4000 apparatus to determine their crystallinity degree.

The results show that the crystallinity degree of the upper side is much greater than that of the lower side and that the intermediate layers have a degrading degree of crystallinity along the thickness of the shaped sheet, from the upper side to the lower one.

Example 2

Blend composition:

80% by weight of recycled PET in the form of flakes obtained by cutting up bottles for mineral water, 8% by weight of PARALOID EXL 3300, and 12% by weight of calcium carbonate.

The procedure was the one described in Example 1 except that:

the sheet was 3 mm thick;

in the third section of the tunnel the temperature of the air conveyed onto the surface of the upper side of the corrugated sheet was 300° C. and the beating time was one and a half minutes approximately;

in the third section of the tunnel the temperature of the air conveyed onto the surface of the lower side was 125° C.; and in the fourth section of the tunnel the temperature of the cooling air was 20° C. approximately.

The properties of the sheet obtained in this way are given in Table 1.

Example 3

Blend composition: 79% by weight of recycled PET in the form of flakes obtained by cutting up bottles for mineral water, 3% by weight of LOTADER™, 3% by weight of LOTRYL™, and 15% by weight of calcium carbonate.

The procedure was the one described in Example 1 except that,.

the sheet was 3 mm thick;

in the third section of the tunnel, the temperature of the air conveyed onto the surface of the upper side of the corrugated sheet was 300° C. and the heating time was one and a half minutes approximately;

in the third section of the tunnel the temperature of the air conveyed onto the surface of the lower side was 125° C.; and in the fourth section of the tunnel the temperature of the cooling air was approximately 23° C.

The properties of the sheet obtained in this way are given in Table 1.

Comparative Example 1

Blend composition:

80% by weight of recycled PET in the form of flakes obtained by cutting up bottles for mineral water, and 20% by weight of calcium carbonate.

The procedure was the one described in Example 1 except that:

the sheet was 3 mm thick;

in the third section of the tunnel the temperature of the air conveyed onto the surface of the upper side of the corrugated sheets was 300° C.;

in the third section of the tunnel the temperature of the air conveyed onto the surface of the lower side was 90° C.; and in the fourth section of the tunnel the temperature of the cooling air was 20° C.

The properties of the sheet obtained in this way are given in Table 1.

Comparative Example 2

The composition of Example 2 was processed as described in the same Example 2 except that the temperature of the air conveyed onto the surface of both the upper side and lower side of the corrugated sheets was 300° C.

The properties of the sheet obtained in this way are given in Table 1.

Comparative Example 3

The composition of Example 2 was processed as described in the same Example 2 except that the temperature of the air conveyed onto the surface of both the upper side and lower side of the corrugated sheets was 150° C.

The properties of the sheet obtained in this way are given in Table 1.

TABLE 1

|  | Flat Sheet | | | | | Corrugated Sheet | | | | | |
| --- | --- | --- | --- | --- | --- | --- | --- | --- | --- | --- | --- |
|  |  | Density g/ml | | | |  |  | Density g/ml | | Hardness | |
|  | U1 | S1 | M1 | I1 | U2 | W | S2 | M2 | I2 | DS | DI |
| Example No. | | | | | | | | | | | |
| 2 | >15 | 1.450 | 1.427 | 1.413 | >15 | 51 | 1.470 | 1.453 | 1.444 | 30 | 19 |
| 3 | >15 | 1.465 | 1.452 | 1.448 | >15 | 51 | 1.476 | 1.458 | 1.452 | 35 | 16 |
| Comparative Examples | | | | | | | | | | | |
| 1 | <10 | | | | <5 | <30 | | | | 42 | 42 |
| 2 | >15 | 1.450 | 1.427 | 1.413 | <5 | 51 | | | | 33 | 31 |
| 3 | >15 | 1.450 | 1.427 | 1.413 | >15 | <10 | | | | 22 | 16 |

The codes of the above Table have the following meanings:

U1 and U2 represent the impact strengths (expressed in joules) of the flat sheet and corrugated sheet respectively, determined by the ball drop test according to ASTM D648.

S1 and S2 represent the densities of the upper layer of the flat sheet and corrugated sheet respectively, determined by hydrostatic scales at 23° C.

M1 and M2 represent the densities of the intermediate layer of the flat sheet and corrugated sheet respectively, determined by hydrostatic scales at 23° C.

I1 and I2 represent the densities of the lower layer of the flat sheet and corrugated sheet respectively, determined by hydrostatic scales at 23° C.

W represents the height in millimetres of the corrugation of the finished corrugated sheet after heating at 70° C. for 24 hours.

DS and DI represent the hardness, expressed in kg/mm$^2$, of the upper and tower layers respectively of the corrugated sheet, determined measuring the area of the mark made by a steel sphere, having a diameter of 4 mm, under a load of 40 kg (Brinell test).

As can be seen from Table 1 above, the sheet according to the present invention (Examples 2 and 3) has impact strength both before and after corrugation (U1 and U2). Moreover, it maintains its shape even after heating at 706° C. for 24 hours (W). Further tests have demonstrated that it does not deform even after having been heated at 85° C. for 24 hours.

The sheet of Comparative Example 1 shows that the absence of rubber makes the sheet too fragile (U1 and U2) despite the differentiated heating. Moreover the sheet in Comparative Example 1 does not maintain its shape.

In the case of Comparative Examples 2 and 3, the composition of the sheet comprised a rubber but the corrugated sheet was not subjected to differentiated heat treatment.

In the flat state, the sheet had good impact strength (U1) both in the case of Comparative Example 2 and in the case of Comparative Example 3.

In the case of Comparative Example 2, heating of both the upper and lower sides of the corrugated sheet with air at 300° C. for approximately one and a half minutes reduced impact strength (U2) considerably.

Nevertheless, heating of both sides with air at 150° a for one and a half minutes approximately (Comparative Example 3) did not have a negative effect on the impact strength of the corrugated sheet (U2) but the latter did not maintain its shape and collapsed after heating at 70° C. for 24 hours (W).

We claim:

1. A corrugated sheetcomprising

50–90% by weight of recycled polyethylene terephthalate,

10–45% by weight of an inert filler, and

5–20% by weight of a rubber, the sheet having a crystallinity gradient such as to maintain its shape, under its own weight, up to a temperature of at least 70° C. for 24 hours and having a greater impact strength compared to that of a shaped sheet having the same composition and no crystallinity gradient.

2. A corrugated sheet according to claim 1, having a thickness of 3 mm which resists the impact of a 2 kg weight having a striking part in the shape of a ball with a diameter of 38 mm, when said corrugated sheet is placed on two supports 125 mm apart and is struck with an energy of approximately 15 joules on a valley of a corrugation of a side of said sheet having higher crystallinity.

3. A corrugated sheet according to claim 1, wherein the rubber is selected from the group consisting of an acrylic core and-shell impact modifier, an ethylene/acrylic ester/maleic anhydride terpolymer, an ethylene/acrylic ester copolymer and blends thereof.

4. A corrugated sheet according to claim 1, wherein the inert filler is a mineral filler selected from the group consisting of quartz, calcium carbonate, talc, titanium dioxide, glass fibers and blends thereof.

5. A corrugated sheet according to claim 1, further containing additives selected from the group consisting of colored pigments, flame retardants and UV ray absorbing agents.

6. A corrugated sheet according to claim 1, having a thickness of at least 1 mm.

7. A corrugated sheet according to claim 6, wherein the thickness is 2–7 mm.

* * * * *